US 8,448,471 B2

(12) United States Patent
Kumatani et al.

(10) Patent No.: US 8,448,471 B2
(45) Date of Patent: May 28, 2013

(54) GLASS SUBSTRATE PROCESSING DEVICE USING LASER BEAM

(75) Inventors: Issei Kumatani, Suita (JP); Seiji Shimizu, Suita (JP)

(73) Assignee: Mitsuboshi Diamond Industrial Co., Ltd., Osaka (JP)

( * ) Notice: Subject to any disclaimer, the term of this patent is extended or adjusted under 35 U.S.C. 154(b) by 213 days.

(21) Appl. No.: 12/827,267

(22) Filed: Jun. 30, 2010

(65) Prior Publication Data

US 2010/0326138 A1 Dec. 30, 2010

(30) Foreign Application Priority Data

Jun. 30, 2009 (JP) .................. 2009-154578
Jun. 30, 2009 (JP) .................. 2009-154579

(51) Int. Cl.
| C03B 33/023 | (2006.01) |
| C03B 33/027 | (2006.01) |
| C03B 33/03  | (2006.01) |
| C03B 33/02  | (2006.01) |

(52) U.S. Cl.
CPC ............. *C03B 33/0222* (2013.01); *C03B 33/03* (2013.01); *C03B 33/023* (2013.01)
USPC .................. 65/273; 65/105; 65/112; 65/269

(58) Field of Classification Search
USPC .......................... 65/286, 105, 112, 269, 273
See application file for complete search history.

(56) References Cited

U.S. PATENT DOCUMENTS

| 2001/0028502 A1 | 10/2001 | Koyama et al. |
| 2002/0196534 A1 | 12/2002 | Lizotte et al. |
| 2003/0052102 A1 | 3/2003 | Amako et al. |
| 2010/0137849 A1 | 6/2010 | Hanft et al. |

FOREIGN PATENT DOCUMENTS

| CN | 2723224 Y | 9/2005 |
| CN | 101291774 A | 10/2008 |
| DE | 10 2007 019 812 A1 | 10/2008 |
| JP | 08-192286 A | 7/1996 |
| JP | 2000-219528 A | 8/2000 |
| JP | 2003-305585 A | 10/2003 |
| JP | 2007-118054 A | 5/2007 |
| TW | 550867 B | 9/2003 |
| WO | WO-2007/000717 A1 | 1/2007 |

OTHER PUBLICATIONS

The extended European Search Report of corresponding European Application No. 10167689.8, dated Oct. 26, 2010.

*Primary Examiner* — Christina Johnson
*Assistant Examiner* — Cynthia Szewczyk
(74) *Attorney, Agent, or Firm* — Global IP Counselors, LLP

(57) ABSTRACT

A processing device is configured to irradiate a laser beam onto a glass substrate for processing. The processing device has a work table, a laser beam output section, a multi-spot focus section, a rotation drive mechanism, an optical system, and a laser beam scan section. The multi-spot focus section receives a laser beam, and splits and focuses the laser beam inputted therein into a plurality of beam focus spots. The rotation drive mechanism rotates the plurality of beam focus spots about a single center axis that is arranged in a center of the plurality of beam focus spots. The optical system guides the laser beam to the multi-spot focus section. The laser beam scan section moves all the plurality of beam focus spots rotating about the single center axis in a desired direction within a predetermined range of a plane arranged along a surface of the glass substrate.

14 Claims, 13 Drawing Sheets

GLASS SUBSTRATE PROCESSING DEVICE USING LASER BEAM

CROSS-REFERENCE TO RELATED APPLICATIONS

This application claims priority to Japanese Patent Application Nos. 2009-154578 filed on Jun. 30, 2009 and 2009-154579 filed on Jun. 30, 2009, the entirety of which is hereby incorporated by reference.

BACKGROUND

1. Field of the Invention

The present invention relates to a glass substrate processing device, more specifically, to a glass substrate processing device configured to process a glass substrate by laser beam irradiation.

2. Background Information

Japan Laid-open Patent Application Publication No. JP-A-2007-118054 describes a well-known glass substrate processing device using a laser beam. The processing device is configured to irradiate a green laser beam having a wavelength of roughly 532 nm onto a work such as a glass substrate. In general, a green laser beam penetrates the glass substrate. However, the laser beam is absorbed by the glass substrate under a condition that the laser beam is concentrated and intensity thereof exceeds a predetermined threshold. Under the condition, plasma is generated in a portion of the glass substrate where the laser beam is concentrated. This results in evaporation of the glass substrate. Based on the aforementioned principle, various types of processing can be executed, including forming a hole in the glass substrate.

On the other hand, Japan Laid-open Patent Application Publication No. JP-A-H08-192286 describes a laser processing device configured to rotate a laser beam on the surface of a work in a predetermined trajectory (e.g., a circular trajectory and an oval trajectory) and scan the work with a laser beam in a predetermined direction (e.g., a transverse direction, a vertical direction, and an oblique direction).

In forming a hole in a glass substrate, for instance, the aforementioned processing device using a laser beam is configured to scan the circumference of a prospective hole (i.e., a processing line) with a laser beam for cutting and dropping an area enclosed by the processing line. In this case, the processing is easily done with the mechanism described in JP-A-H08-192286 configured to spirally rotate a laser beam.

However, a long processing time is required for the well-known method of processing a glass substrate using a laser beam. Therefore, reduction in the processing time has been demanded.

In view of the above, the present invention addresses a need for producing a glass substrate processing device for achieving reduction in time of processing a glass substrate using a laser beam. This invention addresses this need in the art as well as other needs, which will become apparent to those skilled in the art from this disclosure.

SUMMARY

A processing device according to a first aspect is configured to irradiate a laser beam onto a glass substrate for processing the glass substrate. The processing device includes a work table, a laser beam output section, a multi-spot focus section, a rotation drive mechanism, an optical system, and a laser beam scan section. The work table disposes a glass substrate as a processing target thereon. The laser beam output section is configured to output a laser beam. The multi-spot focus section is configured to receive the laser beam and is further configured to split and to focus the laser beam inputted therein into a plurality of beam focus spots. The rotation drive mechanism is configured to rotate the plurality of beam focus spots about a single center axis arranged in a center of the plurality of beam focus spots. The optical system is configured to guide the laser beam outputted from the laser beam output section to the multi-spot focus section. The laser beam scan section is configured to move all the plurality of beam focus spots rotating about the single center axis in a desired direction within a predetermined range of a plane arranged along a surface of the glass substrate.

According to the processing device of the first aspect, a laser beam outputted from the laser beam output section is inputted into the multi-spot focus section through the optical system. The laser beam inputted into the multi-spot focus section is split into plural beam fluxes. The split beam fluxes are further focused into plural beam focus spots. The focus spots are moved in a desired direction by the laser beam scan section while being rotated about the center axis.

Thus, the plurality of beam focus spots are formed and moved along the processing line while being rotated. Accordingly, the glass substrate is processed. Therefore, the processing device can finish processing the glass substrate in a shorter period of time, compared to the well-known processing devices configured to process the substrate with a single beam focus spot.

A processing device according to a second aspect relates to the processing device according to the first aspect. In the processing device, the multi-spot focus section includes a diffractive optical element and a collective lens. The diffractive optical element is herein configured to split the laser beam inputted therein through the optical system into a plurality of laser beam fluxes. The collective lens is configured to concentrate the plurality of laser beam fluxes split by the diffractive optical element.

A processing device according to a third aspect relates to the processing device according to the second aspect. The processing device further includes a z-coordinate moving device configured to move the plurality of beam focus spots in a direction perpendicular to the surface of the glass substrate.

According to the processing device of the third aspect, the plurality of beam focus spots can be moved in the z-coordinate direction perpendicular to the surface of the glass substrate. Therefore, the processing device can process the glass substrates having various thicknesses.

A processing device according to a fourth aspect relates to the processing device according to the third aspect. In the processing device, the z-coordinate moving device is configured to move the multi-spot focus section and the laser beam scan section in the direction perpendicular to the surface of the glass substrate.

According to the processing device of the fourth aspect, the plurality of beam focus spots can be moved in the z-coordinate direction (i.e., a direction of the thickness of the glass substrate) by moving the multi-spot focus section and the laser beam scan section in the z-coordinate direction.

A processing device according to a fifth aspect relates to the processing device according to the first aspect. The processing device further includes a work table moving device configured to move the work table within the predetermined range of the plane arranged along the surface of the glass substrate.

According to the processing device of the fifth aspect, the work can be processed across a scan range of the laser beam scan section by moving the work table. Therefore, the laser beam scan section can be simply structured. Further, a wide range of the work can be processed.

A processing device according to a sixth aspect relates to the processing device according to the second aspect. In the processing device, the rotation drive mechanism is a first hollow motor including a hollow part in the interior thereof. The hollow part supports the diffractive optical element.

A processing device according to a seventh aspect relates to the processing device according to the first aspect. In the processing device, the multi-spot focus section is configured to split and focus the laser beam inputted therein into a plurality of beam focus spots positioned on a circumference of an imaginary circle at an interval of an equal angle.

A processing device according to an eighth aspect relates to the processing device according to the first aspect. In the processing device, the multi-spot focus section is configured to split and focus the laser beam inputted therein into a plurality of beam focus spots linearly aligned.

A processing device according a ninth aspect relates to the processing device according to the first aspect. In the processing device, the work table includes a plurality of support portions. The plurality of support portions are configured to be abutted to a bottom surface of the glass substrate for supporting the glass substrate. The plurality of support portions are allowed to be disposed in predetermined positions without being overlapped with a processing line set on the glass substrate.

When a thick glass substrate is processed, a laser beam is firstly focused on the vicinity of the bottom surface of the glass substrate. Under the condition, the focus spot of the laser beam is moved along a processing line for processing the glass substrate. Next, the focus spot is elevated. Similarly to the above processing, the elevated focus spot is moved along the processing line for processing the glass substrate. The foregoing operations are repeated for executing a desired processing with respect to the glass substrate. In other words, a laser beam is focused on the bottom surface of the glass substrate in the first phase. When overlapped with the processing line, the support portions of the work table may be burned and damaged by irradiation of the laser beam.

According to the processing device of the ninth aspect, however, the support portions of the work table are disposed in predetermined positions without being overlapped with the processing line of the glass substrate. The support portions can be thereby prevented from being burned and damaged by irradiation of the laser beam.

A processing device according to a tenth aspect relates to the processing device according to the first aspect. In the processing device, the laser beam scan section includes an x-directional galvano mirror and a y-directional galvano mirror. The x-directional galvano mirror is herein configured to move the laser beam in an x-coordinate direction within the predetermined range of the plane arranged along the surface of the glass substrate. The y-directional galvano mirror is configured to move the laser beam in a y-coordinate direction perpendicular to the x-coordinate direction within the predetermined range of the plane arranged along the surface of the glass substrate.

According to the processing device of the tenth aspect, the laser beam can be moved in a desired direction within the predetermined range of the plane arranged along the surface of the glass substrate by means of the x-directional galvano mirror and the y-directional galvano mirror.

A processing device according to an eleventh aspect relates to the processing device according to the second aspect. In the processing device, the collective lens is an fθ lens.

A processing device according to a twelfth aspect relates to the processing device according to the first aspect. The processing device further includes a displacement mechanism configured to displace a rotation axis for allowing the plurality of the beam focus spots to rotate thereabout away from the center axis arranged in the center of the plurality of beams focus spots of the laser beam outputted from the multi-spot focus section. Further, the laser beam scan section is configured to circulate the plurality of beam focus spots about the center axis within the predetermined range of the plane arranged along the surface of the glass substrate disposed on the work table under a condition that the plurality of beam focus spots are displaced away from the center axis in conjunction with displacement of the rotation axis.

According to the processing device of the twelfth aspect, plural focus spots are formed and rotated. Further, the rotation axis for the plural focus spots is displaced. The focus spots are displaced in conjunction with displacement of the rotation axis. The displaced focus spots are moved along a circular processing line while being rotated at a predetermined rotational radius. Therefore, the processing device can finish processing a glass substrate along the circular processing line in a shorter period of time, compared to a processing device configured to process the substrate with a single beam focus spot. Further, a structure of displacing the plural focus spots can be formed by, for instance, a pair of wedge prisms. Therefore, the processing device is not required to include two galvano mirrors normally used for a scan with a laser beam. Consequently, the entire processing device can be manufactured at a low cost.

A processing device according to a thirteenth aspect relates to the processing device according to the first aspect. In the processing device, the displacement mechanism includes two wedge prisms opposed to each other.

According to the processing device of the thirteenth aspect, the focus spots can be displaced with a simple structure.

A processing device according to a fourteenth aspect relates to the processing device according to the thirteenth aspect. In the processing device, the displacement mechanism is configured to adjust an interval between the wedge prisms for adjusting a circulation radius of the plurality of beam focus spots circulating about the center axis.

According to the processing device of the fourteenth aspect, the circulation radius of the circular processing line can be changed only by adjusting the interval between the wedge prisms.

A processing device according to a fifteenth aspect relates to the processing device according to the thirteenth aspect. In the processing device, the laser scan section is a second hollow motor including a hollow part in the interior thereof. The hollow part herein supports two wedge prisms.

Overall, the processing device according to the aspects can process a glass substrate with a laser beam in a shorter period of time than the well-known processing devices do. Further, the processing device according to the aspects can be simply structured. Therefore, the processing device can be manufactured at a low cost.

These and other objects, features, aspects, and advantages of the present invention will become apparent to those skilled in the art from the following detailed description, which, taken in conjunction with the annexed drawings, discloses exemplary embodiments.

BRIEF DESCRIPTION OF THE DRAWINGS

Referring now to the attached drawings which form a part of this original disclosure.

DETAILED DESCRIPTION OF THE EXEMPLARY EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

First Exemplary Embodiment
Entire Structure

Figure 1:
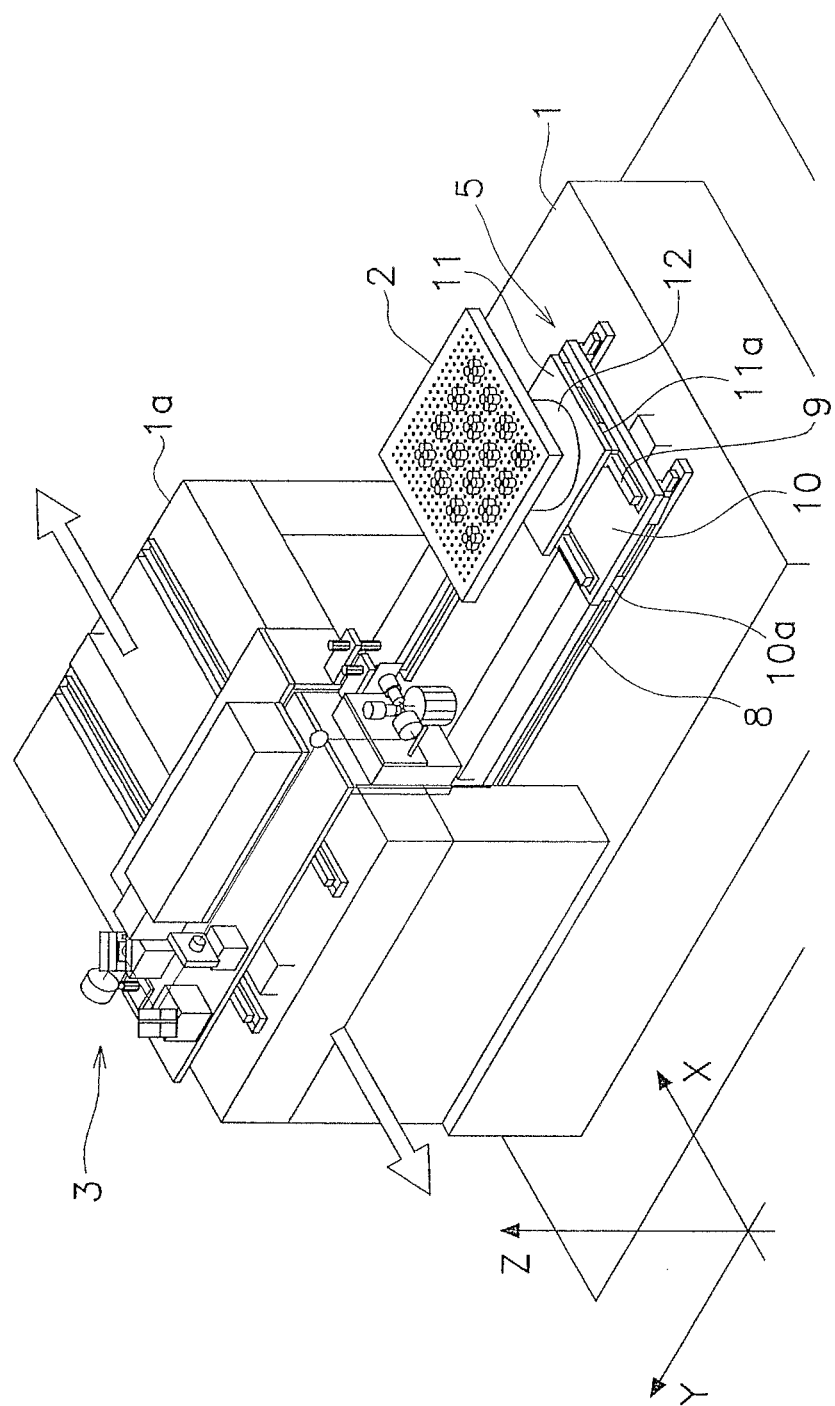
FIG. 1 is an external perspective view of a glass substrate processing device according to a first exemplary embodiment.

FIG. 1 illustrates the entire structure of a glass substrate processing device according to a first exemplary embodiment. The glass substrate processing device is configured to irradiate a laser beam onto a glass substrate for executing various processing (e.g., formation of a hole) with respect to the glass substrate. The glass substrate processing device includes a bed 1, a work table 2, and a laser beam irradiation head 3. The work table 2 is used for disposing the glass substrate as a work thereon. The laser beam irradiation head 3 is configured to irradiate a laser beam onto the glass substrate. Three dimensional coordinates are herein defined as illustrated in FIG. 1. An x-coordinate and a y-coordinate are perpendicular to each other on a plane along the top surface of the bed 1, whereas a z-coordinate is vertically perpendicular to both the x-coordinate and the y-coordinates. Further, two opposite directions in the x-coordinate (i.e., a positive (+) direction and a negative (−) direction) are both defined as an x-coordinate direction. Similarly, two opposite directions in the y-coordinate are both defined as a y-coordinate direction, whereas two opposite directions in the z-coordinate are both defined as a z-coordinate direction.

Work Table and Table Moving Mechanism
Work Table

The work table 2 is formed in a rectangular shape. A table moving mechanism 5 is disposed below the work table 2. The table moving mechanism 5 is configured to move the work table 2 in the x-coordinate direction and the y-coordinate direction.

Figure 2:
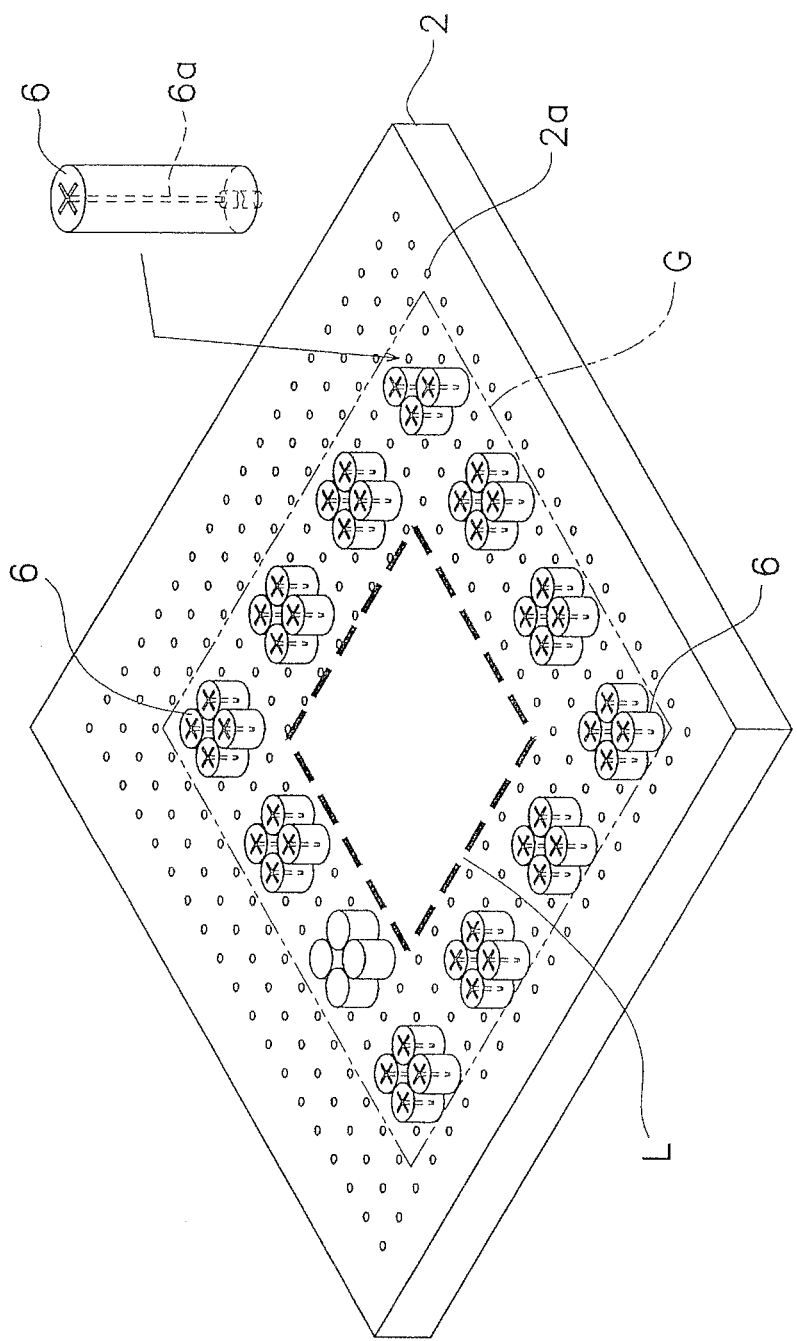
FIG. 2 is an enlarged perspective view of a work table.

As illustrated in an enlarged diagram of FIG. 2, the work table 2 includes plural blocks 6. The blocks 6 are members for supporting a glass substrate G (depicted with a dashed-dotted line in the figure) while lifting up the glass substrate G from the surface of the work table 2. The blocks 6 can be attached to any desirable positions on the work table 2 unless the blocks 6 are overlapped with a processing line L (depicted with a dashed line in the figure). Further, the work table 2 includes plural air inlet holes 2a disposed in a grid arrangement. Each block 6 includes an air inlet aperture 6a vertically penetrating therethrough. The air inlet apertures 6a of the blocks 6 are herein connected to the air inlet holes 2a of the work table 2 in a one-to-one relation. The glass substrate G can be fitted to the blocks 6 when air is sucked through the air inlet apertures 6a and the air inlet holes 2a. It should be noted that the air inlet structure is formed by components such as a well-known discharge pump. Therefore, detailed explanation of the air inlet structure will be hereinafter omitted for the sake of brevity.

Table Moving Mechanism

As illustrated in FIG. 1, the table moving mechanism 5 includes a pair of first guide rails 8, a pair of second guide rails 9, a first moving table 10, and a second moving table 11. The pair of the first guide rails 8 is disposed on the top surface of the bed 1 while being extended in the y-coordinate direction. The first moving table 10 is disposed on the top sides of the first guide rails 8. The first moving table 10 includes plural guide parts 10a on the bottom surface thereof. The guide parts 10a are movably engaged with the first guide rails 8. The second guide rails 9 are disposed on the top surface of the first moving table 10 while being extended in the x-coordinate direction. The second moving table 11 is disposed on the top sides of the second guide rails 9. The second moving table 11 includes plural guide parts 11a on the bottom surface thereof. The guide parts 11a are movably engaged with the second guide rails 9. The work table 2 is attached to the top of the second moving table 11 through a fixation member 12.

The aforementioned table moving mechanism 5 allows the work table 2 to move in the x-coordinate direction and the y-coordinate direction. It should be noted that the first and second moving tables 10, 11 are configured to be driven by a single or plurality of driving units (e.g., well-known motors). Detailed description of the driving unit/units will be hereinafter omitted for the sake of brevity.

Laser Beam Irradiation Head

Figure 3:
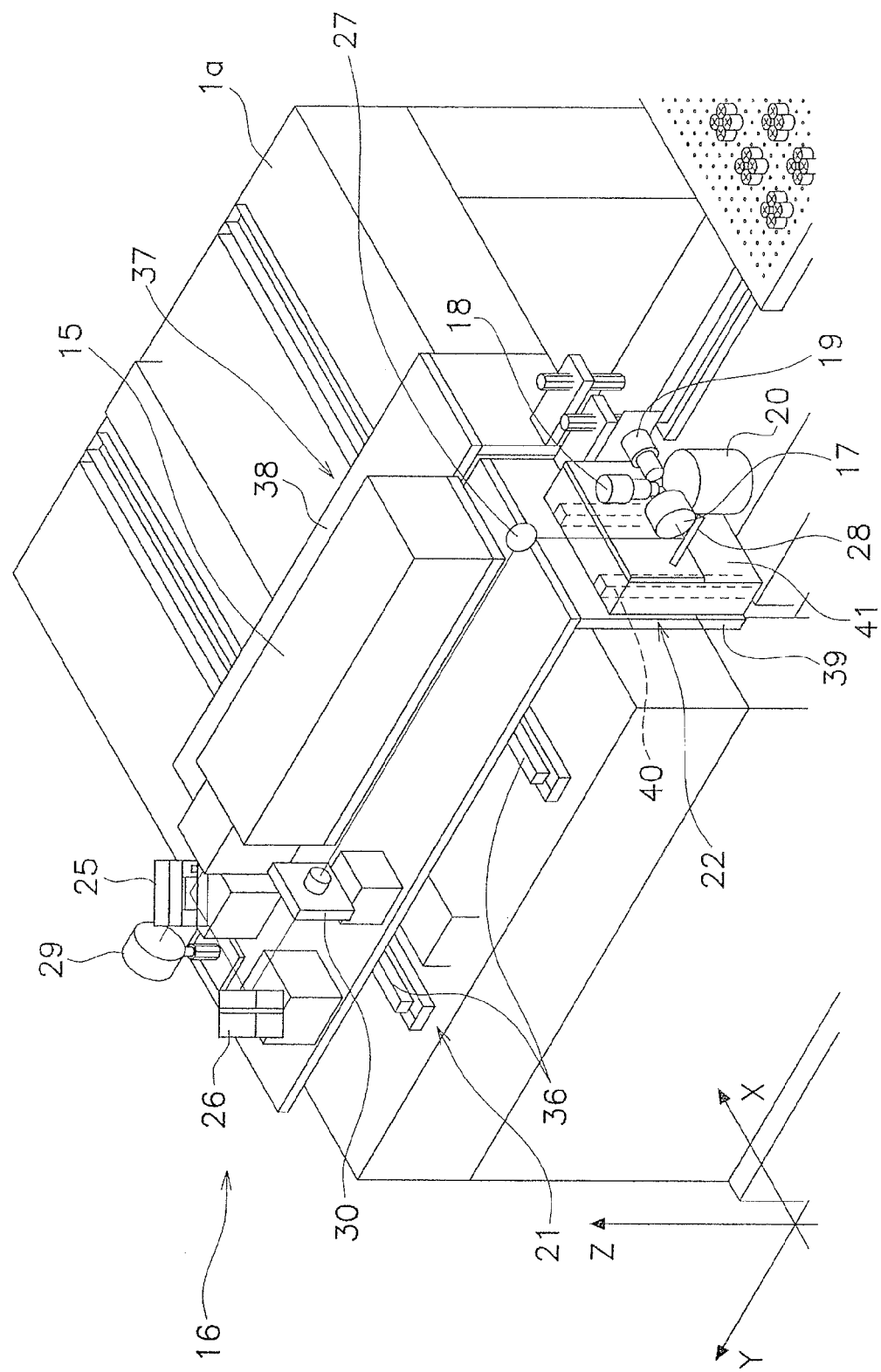
FIG. 3 is an enlarged perspective structural view of a laser beam irradiation head of the glass substrate processing device according to the first exemplary embodiment.

As illustrated in FIGS. 1 and 3, the laser beam irradiation head 3 is attached to a portal frame 1a disposed on the top surface of the bed 1. The laser beam irradiation head 3 includes a laser beam output section 15, an optical system 16, a hollow motor 17 provided with a diffractive optical element in the interior thereof, an x-directional galvano mirror 18, a y-directional galvano mirror 19, and an fθ lens 20 functioning as a collective lens.

Further, an x-coordinate directional moving mechanism 21 and a z-coordinate directional moving mechanism 22 are disposed on the portal frame 1a. The x-coordinate directional moving mechanism 21 is configured to move the laser beam irradiation head 3 in the x-coordinate direction. On the other hand, the z-coordinate directional moving mechanism 22 is configured to move the hollow motor 17, the x-directional galvano mirror 18, the y-directional galvano mirror 19, and the fθ lens 20 in the z-coordinate direction.

Laser Beam Output Section

The laser beam output section 15 is composed of a well-known laser tube. The laser beam output section 15 is configured to irradiate a green laser beam having a wavelength of 532 nm in the y-coordinate direction opposite to the work table 2.

Optical System

The optical system 16 is configured to guide a laser beam irradiated from the laser beam output section 15 to the diffractive optical element (described below) built in the hollow motor 17. As illustrated in the enlarged diagram of FIG. 3, the optical system 16 includes first to fourth mirrors 25-28, a power monitor 29 configured to measure a laser power, and a beam expander 30.

The first mirror 25 is disposed in the vicinity of the output side of the laser beam output section 15. The first mirror 25 is configured to reflect the y-coordinate directionally irradiated laser beam in the x-coordinate direction. The second mirror 26 is aligned with the first mirror 25 in the x-coordinate direction. The second mirror 26 is configured to reflect the x-coordinate directionally traveling laser beam in the y-coordinate direction for guiding the laser beam towards the work table 2. The third mirror 27 is disposed above the hollow motor 17. The third mirror 27 is configured to downwardly (i.e., z-coordinate directionally) guide the laser beam reflected by the second mirror 26. The fourth mirror 28 is disposed laterally closer to the hollow motor 17. The fourth mirror 28 is configured to guide the laser beam reflected by the third mirror 27 towards the hollow motor 17. The beam expander 30 is disposed between the second mirror 26 and the third mirror 27. The beam expander 30 is configured to expand the laser beam reflected by the second mirror 26 to a parallel beam flux having a predetermined magnification. With the beam expander 30, a laser beam can be focused on a smaller spot.

Hollow Motor

Figure 4:
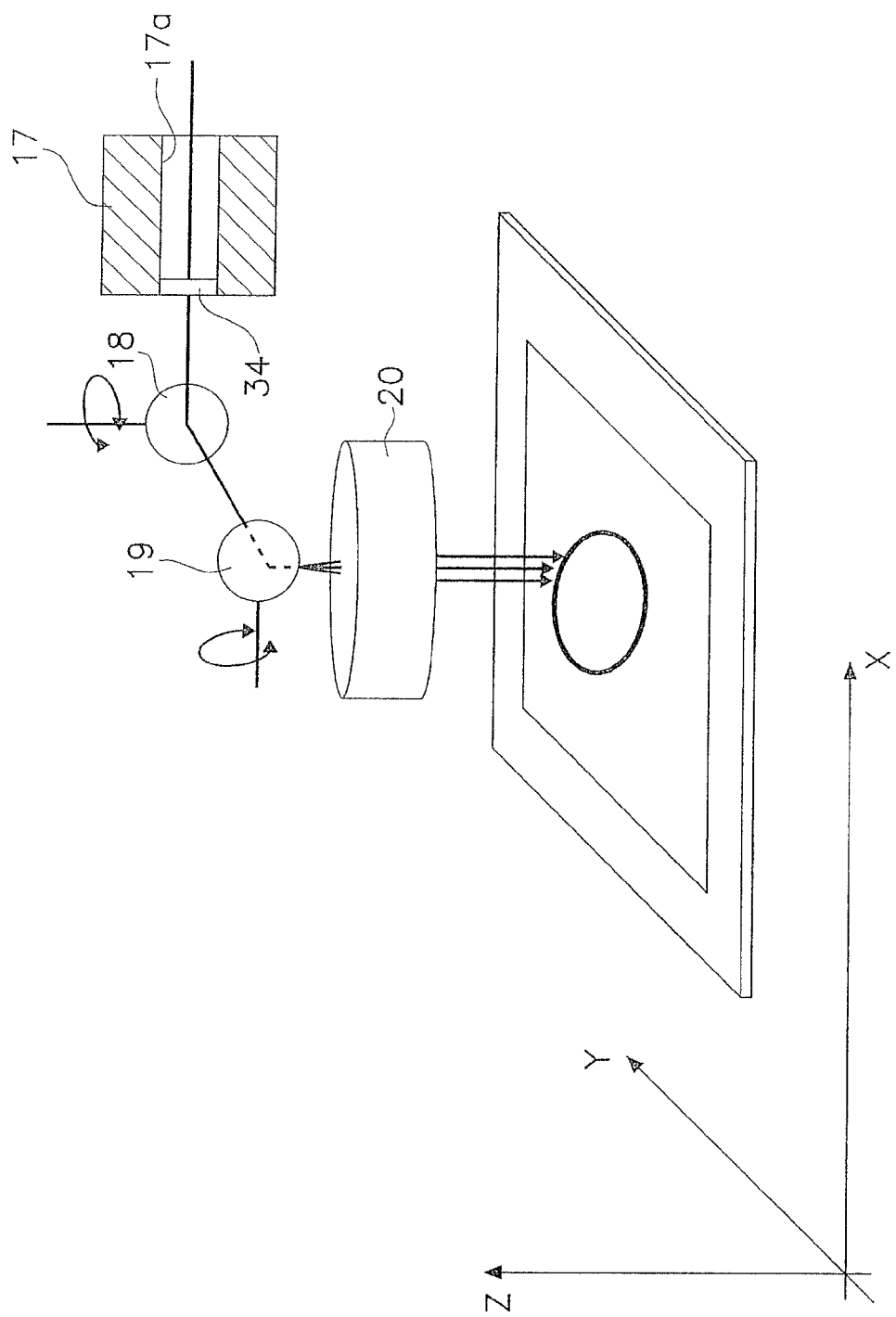
FIG. 4 is a schematic diagram for explaining a scan operation of moving beam focus spots.

As illustrated in a schematic diagram of FIG. 4, the hollow motor 17 includes a hollow center part 17a enclosing a rotation axis. The rotation axis is arranged in the center of the hollow motor 17 while being extended in the x-coordinate direction. Further, a diffractive optical element (DOE) 34 is fixed to the hollow center part 17a. The diffractive optical element 34 is configured to split the inputted laser beam into plural beam fluxes.

X-Directional Galvano Mirror and Y-Directional Galvano Mirror

The x-directional galvano mirror 18 and the y-directional galvano mirror 19 are mirrors of well-known types designed to be used for the galvano scanners. The x-directional galvano mirror 18 is configured to move a beam focus spot of a laser beam on the glass substrate in the x-coordinate direction. On the other hand, the y-directional galvano mirror 19 is configured to move a beam focus spot of a laser beam on the glass substrate in the y-coordinate direction. In conjunction with driving of the x-directional galvano mirror 18 and the y-directional galvano mirror 19, the beam focus spot can be moved within a predetermined range of a plane extended along the surface of the glass substrate in a desired direction.

Fθ Lens

The fθ lens 20 is configured to focus a laser beam on a desired x-coordinate directional position on the surface of or in the inside of the glass substrate. The beam focus position in the z-coordinate direction, as well as the beam focus positions in the x-coordinate direction and the y-coordinate direction, can be controlled within a limited range of roughly 30 mm, for instance.

Support Structure and Moving System for Laser Beam Irradiation Head

As described above, the aforementioned laser beam irradiation head 3 is supported by the portal frame 1a of the bed 1. More specifically, as illustrated in FIG. 3, a pair of third guide rails 36 is disposed on the top surface of the portal frame 1a while being extended in the x-coordinate direction. The pair of the third guide rails 36 and a driving mechanism (not illustrated in the figure) form the x-coordinate directional moving mechanism 21. Further, the pair of the third guide rails 36 supports a support member 37 while allowing the support member 37 to move in the x-coordinate direction. The support member 37 includes a transverse support member 38 and a vertical support member 39. The transverse support member 38 is supported by the third guide rails 36, whereas the vertical support member 39 is downwardly extended from an end of the transverse support member 38 (i.e., an end closer to the work table 2). A pair of fourth guide rails 40 is disposed on the lateral surface of the vertical support member 39 while being extended in the z-coordinate direction. The pair of the fourth guide rails 40 and a driving mechanism (not illustrated in the figure) form the z-coordinate directional moving mechanism 22. The pair of the fourth guide rails 40 supports a third moving table 41 while allowing it to move in the z-coordinate direction.

Further, the transverse support member 38 supports the laser beam output section 15, the first to third mirrors 25-27, the power monitor 29, and the beam expander 30. On the other hand, the third moving table 41 supports the fourth mirror 28, the hollow motor 17, the x-directional galvano mirror 18, the y-directional galvano mirror 19, and the fθ lens 20.

Structural and Configurational Summary of Laser Beam Irradiation Head

The aforementioned components form a multi-spot focus section, a rotation drive mechanism, and a laser beam scan section. The multi-spot focus section is configured to split and focus an inputted laser beam into plural spots. The rotation drive mechanism is configured to rotate the plural beam focus spots about a single rotation axis. The laser beam scan section is configured to move all the plural beam focus spots, rotating about the single rotation axis, within a predetermined range of a plane extended along the surface of a glass substrate in a desired direction. Specifically, the multi-spot focus section is composed of the diffractive optical element 34 and the fθ lens 20. The rotation drive mechanism is composed of the hollow motor 17. The laser beam scan section is composed of the x-directional galvano mirror 18 and the y-directional galvano mirror 19.

Operation

The following description relates to an operation of processing a glass substrate using a laser beam.

First, the plural blocks 6 are disposed on the surface of the work table 2. As illustrated in FIG. 2, the plural blocks 6 are herein disposed without being overlapped with the processing line L of the glass substrate G. The glass substrate G to be processed is then disposed on the plural blocks 6 set as described above.

Next, the x-coordinate directional moving mechanism 21 moves the laser beam irradiation head 3 to an appropriate position in the x-coordinate direction, whereas the table moving mechanism 5 moves the work table 2 to an appropriate position in the y-coordinate direction. Accordingly, a beam focus spot of a laser beam to be irradiated by the laser beam irradiation head 3 is appropriately arranged in a starting position of the processing line L.

Thus, the laser beam irradiation head 3 and the glass substrate G are moved to the processing positions. Now, a laser beam is irradiated onto the glass substrate G for processing the glass substrate G. The laser beam output section 15 irradiates a laser beam. The irradiated laser beam is reflected by the first mirror 25, and is accordingly guided to the second mirror 26. It should be noted that the power monitor 29 is configured to measure a laser power of the laser beam incident upon the first mirror 25. The laser beam incident upon the second mirror 26 is reflected in the y-coordinate direction and guided towards the third mirror 27. Meanwhile, the beam expander 30 expands the laser beam reflected by the second mirror 26 into a laser beam flux. The laser beam flux incident upon the third mirror 27 is reflected in the downward direction towards the fourth mirror 28. The laser beam flux incident upon the fourth mirror 28 is reflected towards the hollow motor 17. Accordingly, the laser beam flux is inputted into the diffractive optical element 34 disposed in the hollow center part 17a of the hollow motor 17.

Plural beam focus spots are herein formed on the glass substrate by a group of components including the diffractive optical element 34, the x-coordinate directional galvano mirror 18, the y-coordinate directional galvano mirror 19, and the fθ lens 20. The operation of forming plural beam focus spots on the glass substrate will be hereinafter explained in detail.

Figure 5:
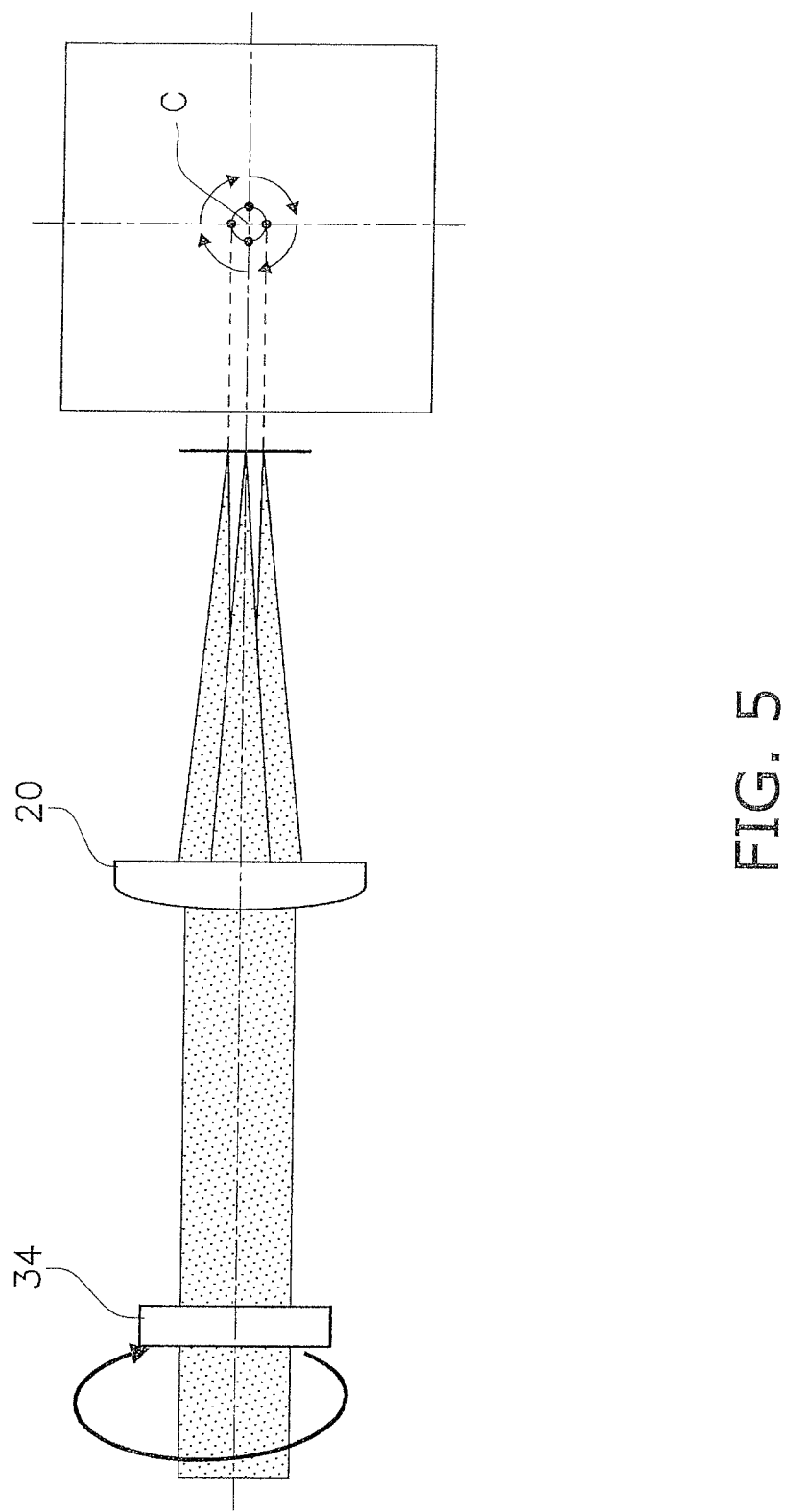
FIG. 5 is a schematic diagram for explaining actions of a diffractive optical element and an fθ lens.

FIG. 5 schematically illustrates operations of the diffractive optical element 34 and the fθ lens 20. The diffractive optical element 34 is configured to split the laser beam flux incident thereupon into plural beam focus spots. The divisional setting herein depends on the specification of the diffractive optical element 34. FIG. 5 exemplifies a case that the diffractive optical element 34 and the fθ lens 20 form four focal spots (i.e., beam focus spots) disposed on the circumference of an imaginary circle at an interval of 90 degrees. All the beam focus spots can be rotated about a center axis C in conjunction with rotation of the diffractive optical element 34 moved by the hollow motor 17.

Subsequently, all the four rotating beam focus spots are moved along the processing line L (e.g., a rectangular line in FIG. 2 and a circular line in FIG. 4) in conjunction with controlling of the x-coordinate directional galvano mirror 18 and the y-coordinate directional galvano mirror 19. In other words, the four beam focus spots are configured to be moved along the processing line while rotating about the center axis C.

The glass substrate is herein configured to be processed at a thickness of tens of urn in a single operation using a laser beam. It is therefore generally difficult to form a hole in the glass substrate G, i.e., to cut and drop an area enclosed by the processing line, by a single scan of moving the beam focus spots along the processing line.

Figure 6A:
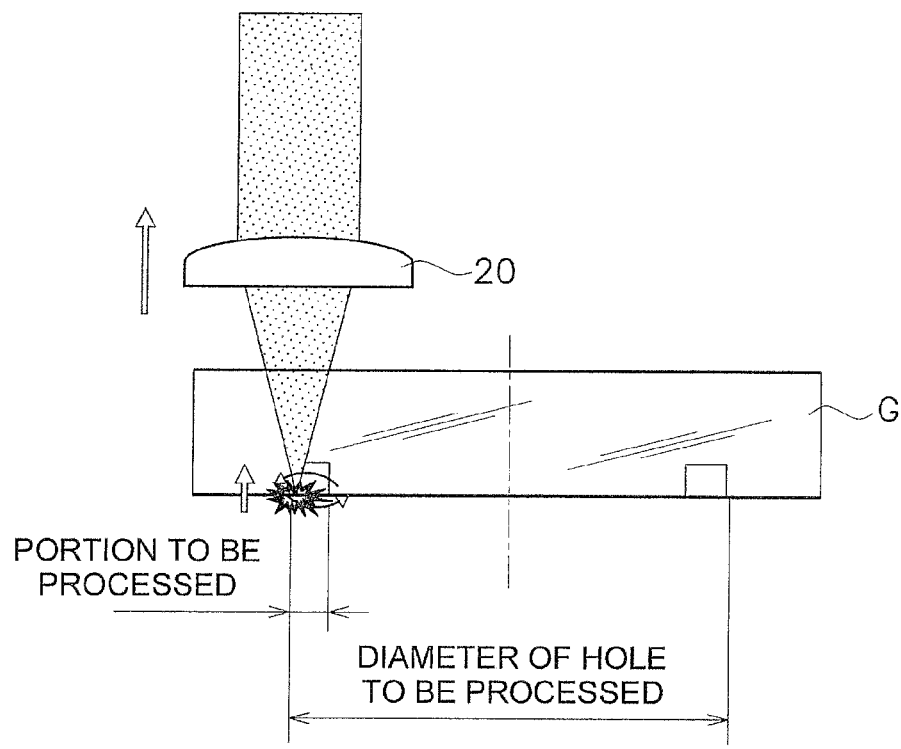
FIGS. 6A and 6B are schematic diagrams for explaining an action of controlling the beam focus spots in a z-coordinate direction.
Figure 6B:
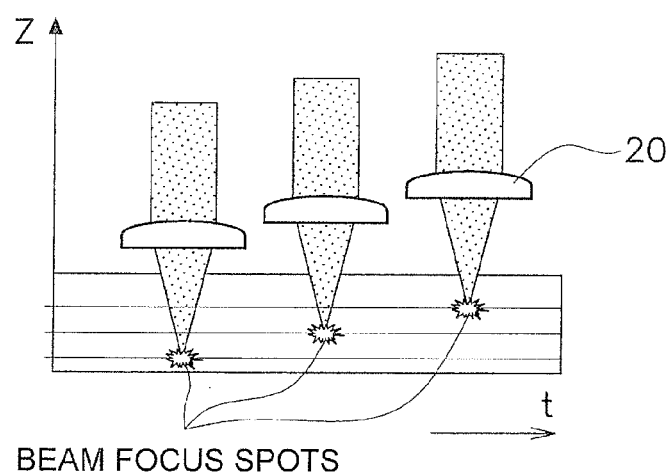

In view of the above, the fθ lens 20 is normally controlled for forming the beam focus spot (i.e., a processing portion) on the bottom surface of the glass substrate (see FIG. 6A). Under the condition, the beam focus spot is circulated once along the processing line. Then, the beam focus spot is elevated by controlling the fθ lens 20 (see FIG. 6B). Similarly, the beam focus spot is again circulated once along the processing line. Then, the beam focus spot is further elevated. With repetition of the aforementioned operation, a hole can be formed in the glass substrate by cutting and dropping the area enclosed by the processing line.

It should be noted in some cases that the processing line is widely set and thus exceeds a scan range of the x-directional galvano mirror 18 and that of the y-directional galvano mirror 19. In this case, the table moving mechanism 5 moves the work table 2 in the x-coordinate direction and the y-coordinate direction after the aforementioned processing is completed. Accordingly, the position of the glass substrate is changed. Similarly to the aforementioned manner, the glass substrate can be subsequently processed by a scan with a laser beam through the control of the x-directional galvano mirror 18 and the y-directional galvano mirror 19.

Features (1) According to the glass substrate processing device of the present exemplary embodiment, plural beam focus spots are formed on a glass substrate, and the glass substrate is processed along a processing line by moving the beam focus spots along the processing line while rotating about a rotation axis. Therefore, the glass substrate processing device can process the glass substrate in a shorter period of time than the well-known processing devices do.

(2) According to the glass substrate processing device of the present exemplary embodiment, the laser beam irradiation head 3 can be moved in the z-coordinate direction. Therefore, the glass substrate processing device can process glass substrates having various thicknesses.

(3) According to the glass substrate processing device of the present exemplary embodiment, the work table 2 can be moved in both of the x-coordinate direction and the y-coordinate direction. Therefore, the glass substrate processing device can process a wide range of a glass substrate across a scan range of the x-directional galvano mirror 18 and that of the y-directional galvano mirror 19.

(4) According to the glass substrate processing device of the present exemplary embodiment, the fθ lens 20 is used as a collective lens. Therefore, the glass substrate processing device can accurately maintain a z-coordinate directional position of a beam focus spot over a scan range.

(5) According to the glass substrate processing device of the present exemplary embodiment, the plural blocks 6 can be disposed in various positions on the work table 2 without being overlapped with a processing line. Therefore, the plural blocks 6 can be prevented from being burned and damaged by a laser beam. Due to the same reason, any limitations are not imposed on the processing line by the plural blocks 6.

Modifications of First Exemplary Embodiment (a) In the aforementioned exemplary embodiment, the z-coordinate directional moving mechanism 22 is used as a mechanism for moving the beam focus spots in the z-coordinate direction. Further, the z-coordinate directional moving mechanism 22 is configured to move the hollow motor 17, the x-directional galvano mirror 18, the y-directional galvano mirror 19, and the fθ lens 20 in the z-coordinate direction. However, the work table 2 may be configured to be moved in the z-coordinate direction without moving the hollow motor 17, the x-directional galvano mirror 18, the y-directional galvano mirror 19, and the fθ lens 20.

(b) In the aforementioned exemplary embodiment, the fθ lens is used as a collective lens. However, the collective lens is not limited to the fθ lens as long as it can focus a laser beam.

Alternate Embodiments

Alternate embodiments will now be explained. In view of the similarity between the first and alternate embodiments, the parts of the alternate embodiments that are identical to the parts of the first embodiment will be given the same reference numerals as the parts of the first embodiment. Moreover, the descriptions of the parts of the alternate embodiments that are identical to the parts of the first embodiment may be omitted for the sake of brevity.

Second Exemplary Embodiment

Entire Structure

Figure 7:
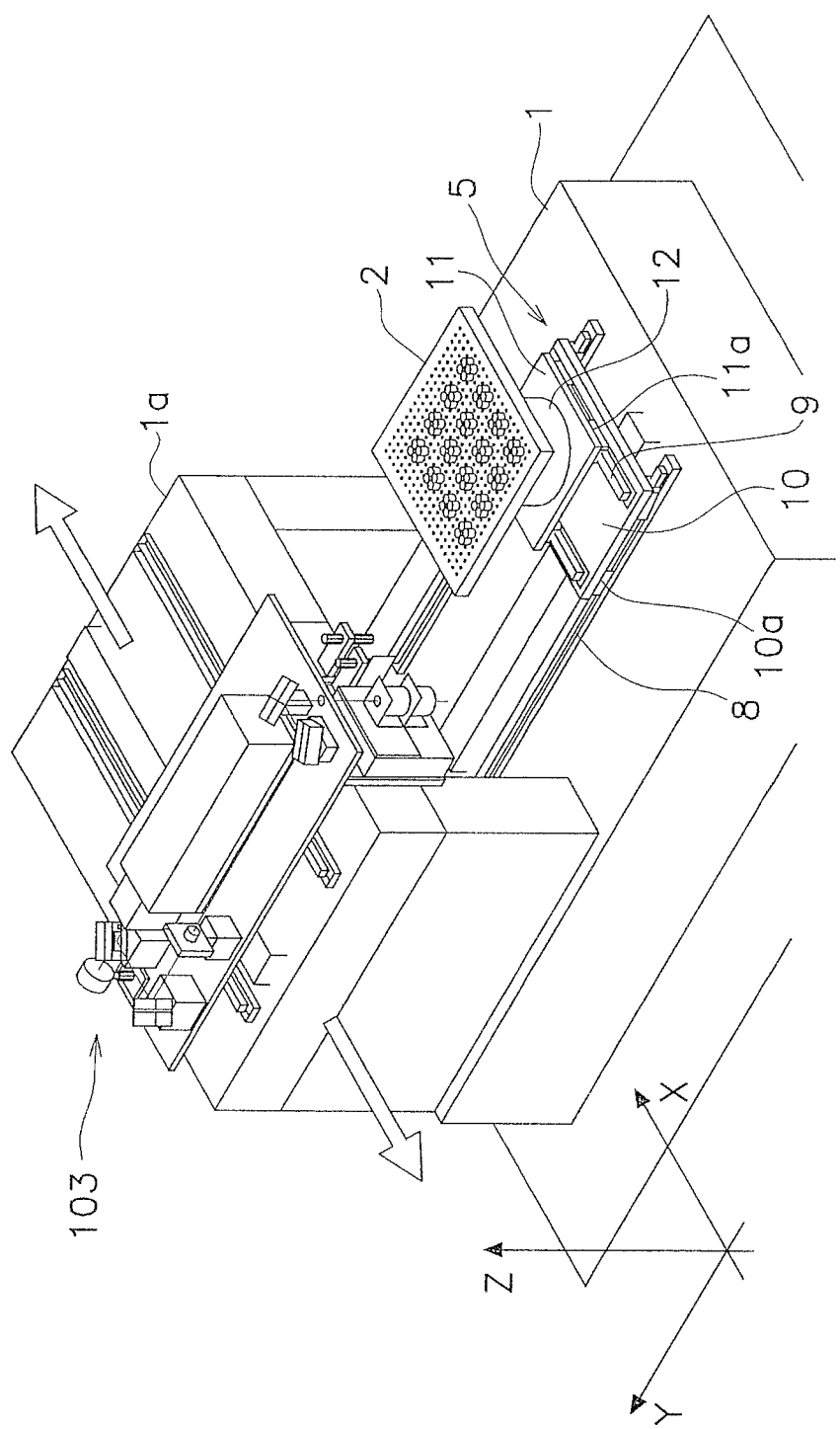
FIG. 7 is an external perspective view of a glass substrate processing device according to a second exemplary embodiment.
Figure 8:
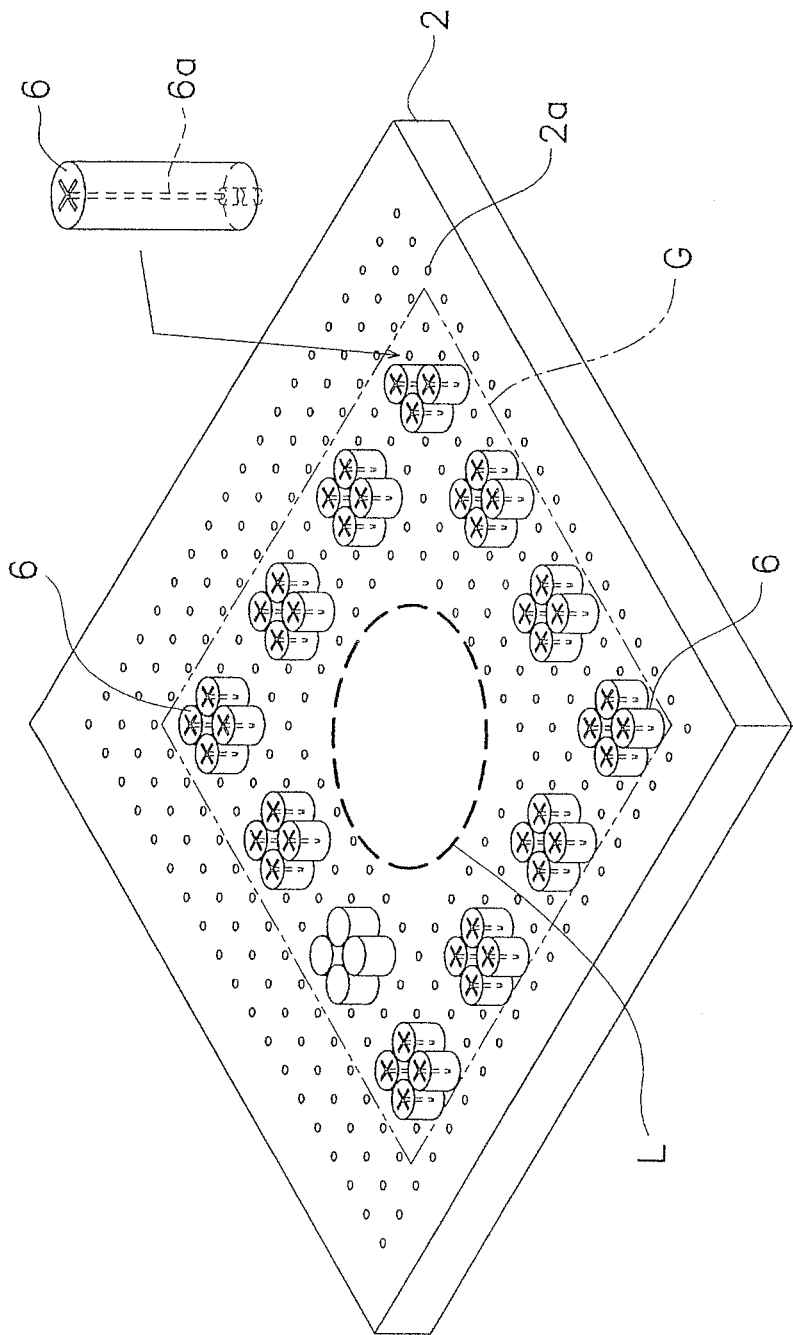
FIG. 8 is an enlarged perspective view of a work table in the second exemplary embodiment.

FIG. 7 illustrates the entire structure of a glass substrate processing device according to a second exemplary embodiment. The glass substrate processing device is configured to irradiate a laser beam onto the glass substrate G along the processing line L (depicted with a dashed line in FIG. 8) for executing various processing (e.g., formation of a hole). The glass substrate processing device of the second exemplary embodiment has a structure basically identical to that of the glass substrate processing device of the first exemplary embodiment excluding a structure of a laser beam irradiation head. An identical reference numeral is assigned to a component commonly used in the glass substrate processing device of the first exemplary embodiment and that of the second exemplary embodiment. This is also true to a component commonly used in the laser beam irradiation head in the first exemplary embodiment and that in the second exemplary embodiment. The following description only relates to a structure of the laser beam irradiation head in the second exemplary embodiment, which is different from that of the laser beam irradiation head in the first exemplary embodiment.

Laser Beam Irradiation Head

Figure 9:
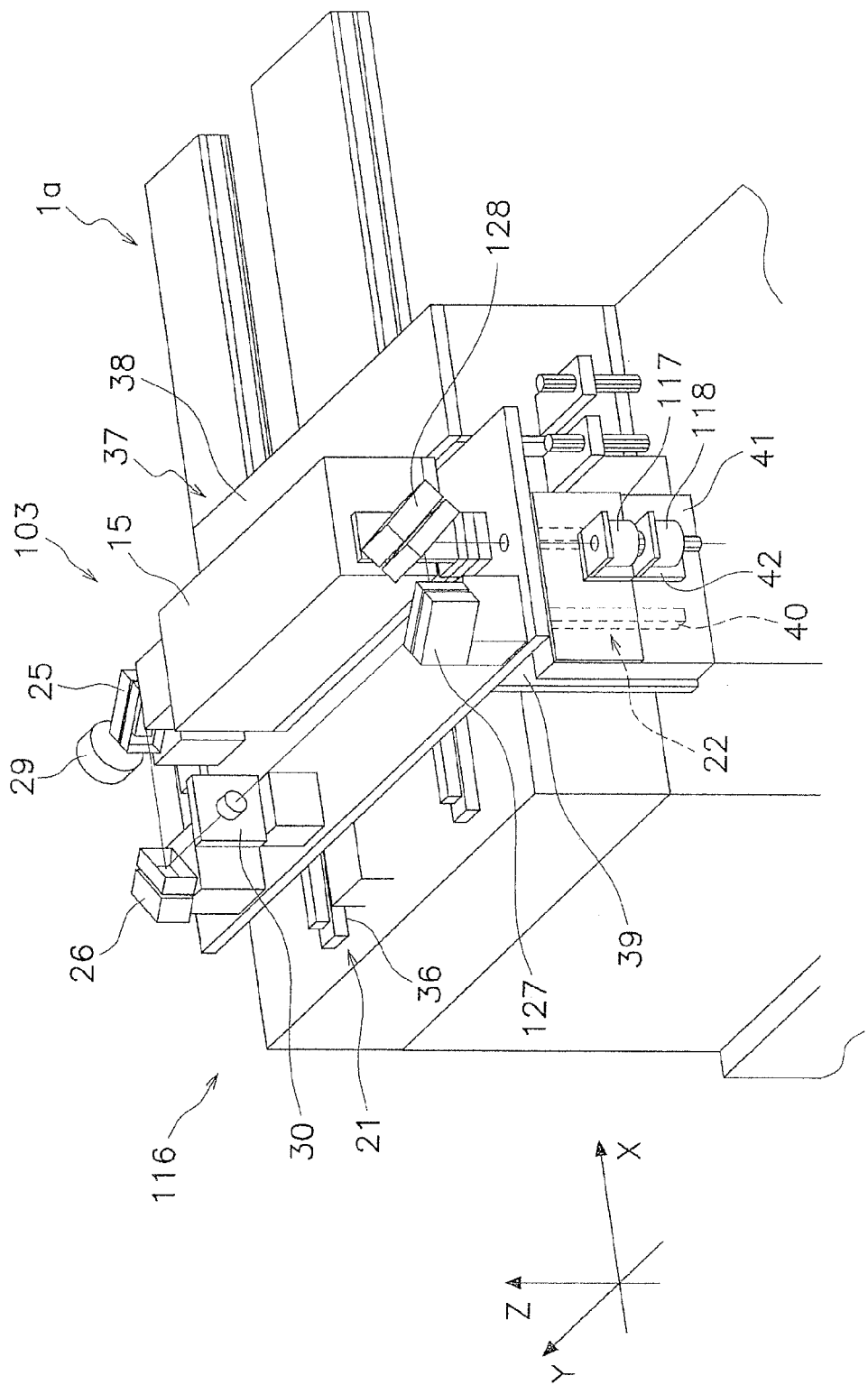
FIG. 9 is an enlarged perspective structural view of a laser irradiation head of the glass substrate processing device according to the second exemplary embodiment.

As illustrated in FIGS. 7 and 9, a laser beam irradiation head 103 is attached to a portal frame 1a disposed on the top surface of a bead 1. The laser beam irradiation head 103 includes a laser beam output section 15, an optical system 116, a first hollow motor 117 provided with a diffractive optical element in the interior thereof, and a second hollow motor 118 provided with a collective lens and a pair of wedge prisms (described below) in the interior thereof. Further, an x-coordinate directional moving mechanism 21 and a z-coordinate directional moving mechanism 22 are disposed on the portal frame 1a. The x-coordinate directional moving mechanism 21 is configured to move the laser beam irradiation head 103 in the x-coordinate direction. On the other hand, the z-coordinate directional moving mechanism 22 is configured to move the first hollow motor 17 and the second hollow motor 116 in the z-coordinate direction.

Laser Beam Output Section

The laser beam output section 15 in the second exemplary embodiment has a structure completely identical to that in the first exemplary embodiment.

Optical System

An optical system 116 is configured to guide a laser beam irradiated from the laser beam output section 15 to the diffractive optical element built in the first hollow motor 17. As illustrated in an enlarged diagram of FIG. 9, the optical system 116 includes a first mirror 25, a second mirror 26, a third mirror 127, a fourth mirror 128, a power monitor 29 configured to measure a laser power, and a beam expander 30.

The first mirror 25, the second mirror 26, and the beam expander 30 are identical to those in the first exemplary embodiment. The third mirror 127 and the fourth mirror 128 are disposed above the first hollow motor 117. The third mirror 127 is configured to guide a laser beam reflected by the second mirror 26 towards the fourth mirror 128 (i.e., in the x-coordinate direction). The fourth mirror 128 is configured to guide the laser beam reflected by the third mirror 127 to the first hollow motor 17.

First Hollow Motor

The first hollow motor 17 is structured basically identical to the hollow motor 17 in the first exemplary embodiment. As illustrated in a schematic diagram of FIG. 10, the first hollow motor 117 includes a hollow center part 117a enclosing a rotation axis R. The rotation axis R is arranged in the center of the first hollow motor 117 while being extended in the z-coordinate direction. A diffractive optical element (DOE) 132 is fixed to the hollow center part 117a. The diffractive optical element 132 is configured to split an inputted laser beam into plural beam fluxes. With the structure, the diffractive optical element 132 is configured to be rotated about a center axis (i.e., the rotation axis R) of the first hollow motor 117.

Second Hollow Motor

The second hollow motor 118 is configured to function as a displacement mechanism and a laser scan section. As illustrated in a schematic diagram of FIG. 10 and a cross-sectional diagram of FIG. 11, a rotational axis is arranged in the center of the second hollow motor 118 while being extended in the z-coordinate direction. The rotation axis is coaxial to the rotation axis R of the first hollow motor 117. The second hollow motor 118 includes a hollow part 118a enclosing the rotation axis R. A first tubular member 133a is fixed to the hollow part 118a. A first wedge prism 134a is disposed in an end of the inner peripheral part of the first tubular member 133a. Further, a second tubular member 133b is disposed in the inner peripheral part of the first tubular member 133a while being allowed to move in the z-coordinate direction. A second wedge prism 134b is fixed to one end of the second tubular member 133b, and a collective lens 135 is fixed to the other end of the second tubular member 133b.

With the structure, a pair of the first and second wedge prisms 134a, 134b and the collective lens 135 are allowed to rotate about the center axis (i.e., the rotation axis R) of the second hollow motor 118. Further, the second wedge prism 134b is allowed to be disposed closer to and away from the first wedge prism 134a.

It should be noted that the collective lens 135 is fixed to the second tubular member 133b together with the second wedge prism 134b. However, the collective lens 135 may be disposed independently from the second hollow motor 118 as an individual component.

Support Structure and Moving System of Laser Beam Irradiation Head

A support structure and a moving system for the laser beam irradiation head 103 in the second exemplary embodiment are structured basically identical to those for the laser beam irradiation head 3 in the first exemplary embodiment. In short, the laser beam irradiation head 103 is supported by the portal frame 1a of the bed 1. Further, the x-coordinate directional moving mechanism 21 is disposed on the top surface of the portal frame 1a and includes a pair of third guide rails 36. Yet further, a support member 37 includes a transverse support member 38 and a vertical support member 39. It should be noted in the second exemplary embodiment that a motor support member 42 is fixed to a third moving table 41 and supports the first hollow motor 17 and the second hollow motor 118.

Structural and Configurational Summary of Laser Beam Irradiation Head

The aforementioned components in the second exemplary embodiment form a multi-spot focus section and a rotation mechanism. The multi-spot focus section is herein configured to split and focus an input laser beam into plural spots. The rotation mechanism is configured to rotate the plural beam focus spots about a center axis arranged in the center of the plural beam focus spots of the laser beam irradiated by the multi-spot focus section. Further, the aforementioned components form a displacement mechanism and a laser beam scan section. The displacement mechanism is herein configured to displace a rotation axis, allowing the plural beam focus spots to rotate thereabout, away from the center axis arranged in the center of the plural beam focus spots of the laser beam irradiated by the multi-spot focus section. The laser beam scan section is configured to circulate the plural beam focus spots about the center axis within a predetermined range of a plane arranged along the surface of the glass substrate disposed on the work table under the condition that the plural beam focus spots are displaced away from the center axis in conjunction with displacement of the rotation axis. Specifically, the multi-spot focus section is composed of the diffractive optical element 132 and the collective lens 135. The rotation mechanism is composed of the first hollow motor 17. The laser beam scan section is composed of the second hollow motor 118. The displacement mechanism is composed of the pair of the first and second wedge prisms 134a, 134b.

Operations

The following description relates to an operation of processing a glass substrate using a laser beam. The processing operation in the second exemplary embodiment is identical to that in the first exemplary embodiment regarding the step of disposing the plural blocks 6 on the surface of the work table 2 and the step of moving the laser beam irradiation head 103 and the work table 2 to appropriate positions, respectively, for arranging a beam focus spot of a laser beam to be irradiated by the laser beam irradiation head 103 in a starting position of the processing line L on a glass substrate G.

Thus, the laser beam irradiation head 103 and the glass substrate G are moved to processing positions. A laser beam is then irradiated onto the glass substrate G for processing the glass substrate G. The laser beam is herein irradiated by the laser beam output section 15. The irradiated laser beam is reflected by the first mirror 25 and guided to the second mirror 26. It should be noted that the power monitor 29 measures a laser power of the laser beam incident upon the first mirror 25. The laser beam incident upon the second mirror 26 is reflected in the y-coordinate direction and guided to the third mirror 127. Meanwhile, the beam expander 30 is configured to expand the laser beam reflected by the second mirror 26 into a laser beam flux. The laser beam flux incident upon the third mirror 127 is reflected towards the fourth mirror 128. The laser beam flux incident upon the fourth mirror 128 is reflected in the downward direction. Accordingly, the laser beam flux is inputted into the diffractive optical element 132 disposed in the center part of the first hollow motor 117.

Plural beam focus spots are formed on the glass substrate G by a group of components including the diffractive-optical element 132, the collective lens 135, and the pair of the first and second wedge prisms 134a, 134b. An operation of forming plural beam focus spots will be hereinafter explained in detail.

Figure 12:
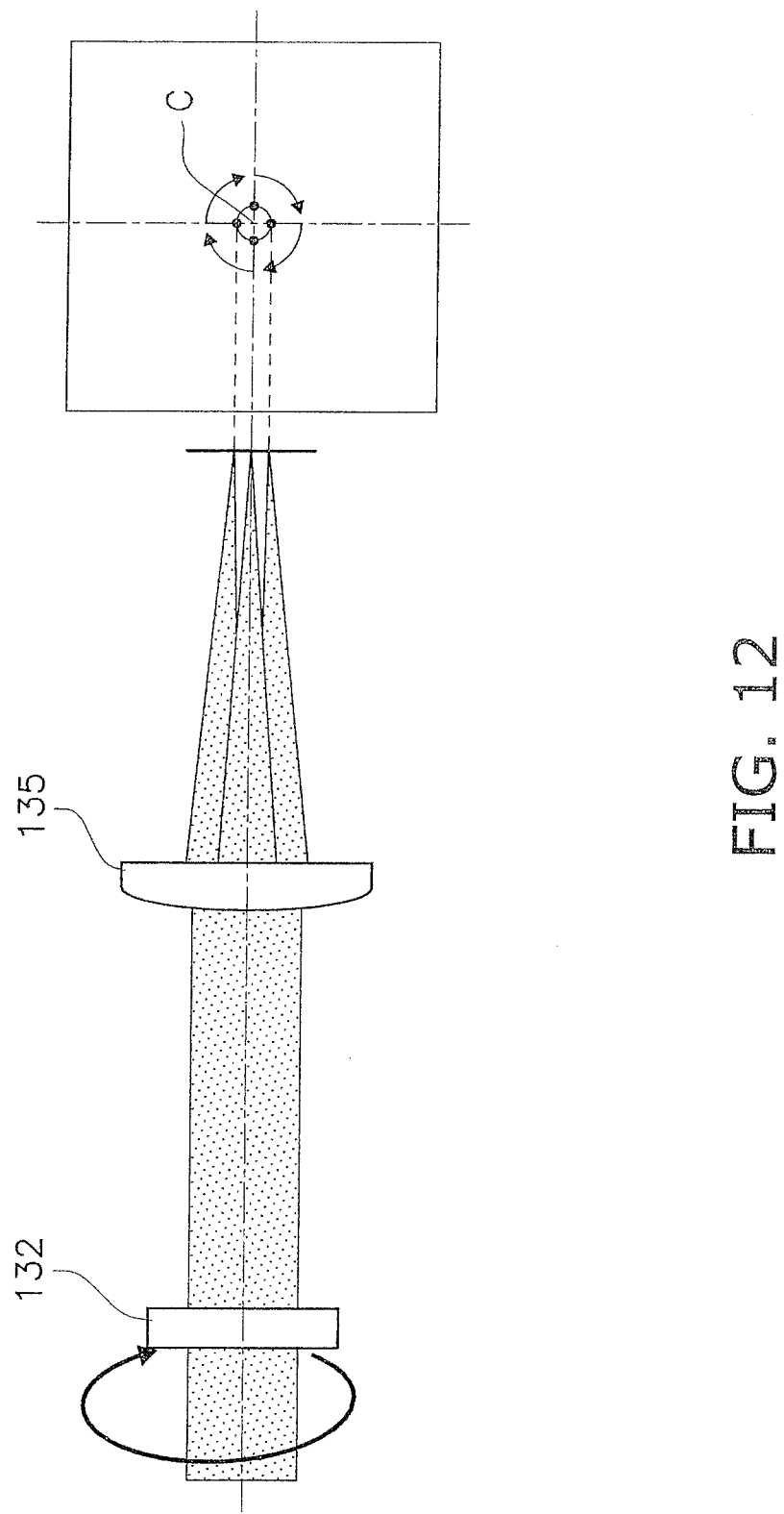
FIG. 12 is a schematic diagram for explaining actions of a diffractive optical element and a collective lens in the second exemplary embodiment.

FIG. 12 schematically illustrates operations of the diffractive optical element 132 and the collective lens 135. It should be noted that the pair of the wedge prisms 134a, 134b is not illustrated in FIG. 12 for the sake of convenience in explanation. As illustrated in FIG. 12, a laser beam inputted into the diffractive optical element 132 is split into plural beam fluxes. It should be noted division of the laser beam into beam fluxes depends on a specification of the diffractive optical element 132. FIG. 12 exemplifies a case that the diffractive optical element 132 and the collective lens 135 form four focal spots (i.e., beam focus spots) disposed on the circumference of an imaginary circle at an interval of 90 degrees. All the four beam focus spots are configured to be rotated about the center axis C in conjunction with rotation of the diffractive optical element 132 moved by the first hollow motor 117.

Figure 10:
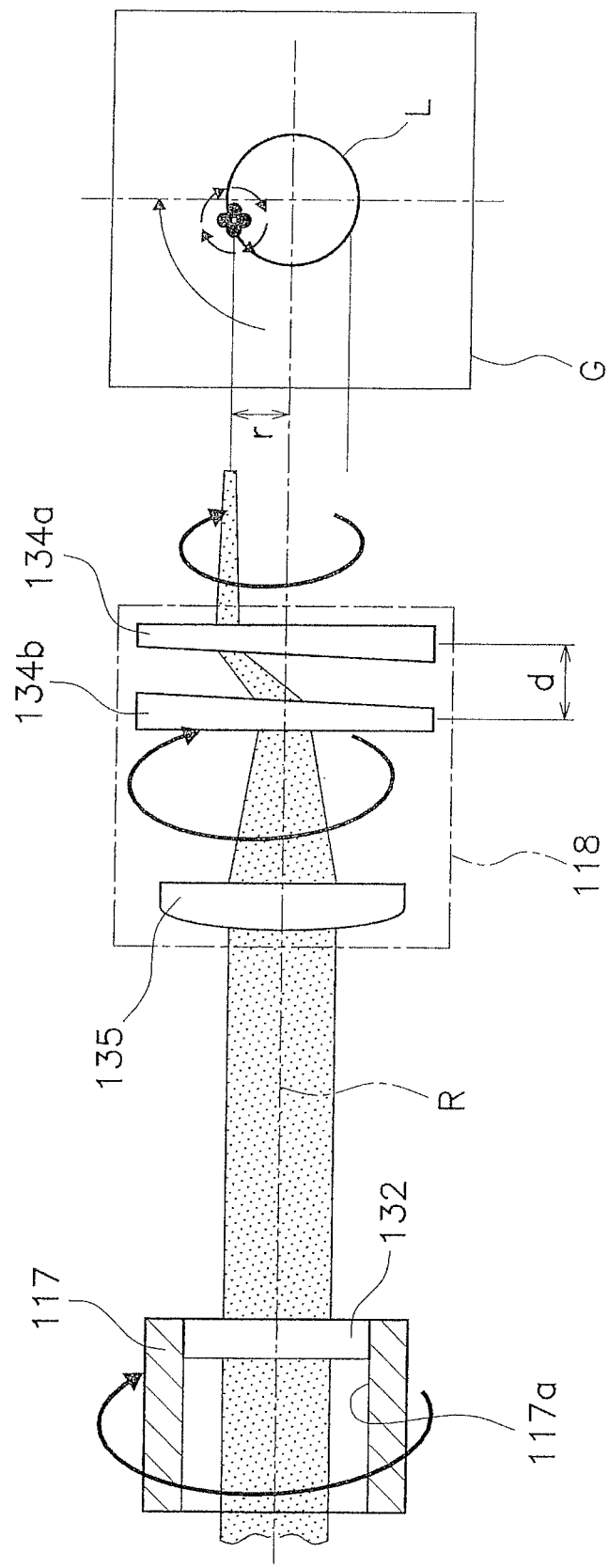
FIG. 10 is a schematic diagram for explaining an operation of scanning a beam focus spot in the second exemplary embodiment.
Figure 11:
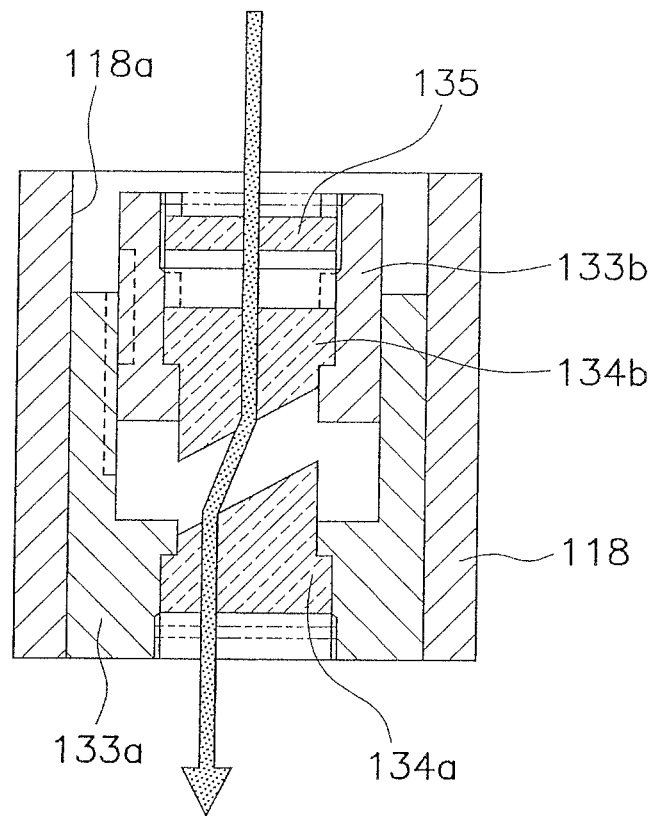
FIG. 11 is a cross-sectional schematic structural view of a second hollow motor in the second exemplary embodiment.

The laser beam fluxes, outputted from the collective lens 135 as described above, pass through the pair of the first and second wedge prisms 134a, 134b. The laser beam fluxes can be accordingly displaced from the center axis (i.e., the rotation axis R of the first hollow motor 117) by a distance identical to a radius r, as illustrated in FIG. 10. In other words, when receiving the laser beam fluxes from the collective lens 135, the second wedge prism 134b is configured to refract the laser beam fluxes incident thereupon at an angle of $\theta$ with respect to the incident angle of the laser beam fluxes. When receiving the laser beam fluxes from the second wedge prism 134b, the first wedge prism 134a is configured to refract the laser beam fluxes incident thereupon at an angle of $-\theta$ with respect to the incident angle of the laser beam fluxes (i.e., at an angle symmetrical to the refraction angle in the second wedge prism 134b with respect to the incident angle of the laser beam fluxes). Accordingly, the rotation axis (i.e., the center axis C) of the four beam focus spots is configured to be displaced away from the center axis (i.e., the rotation axis R) of the first hollow motor 117 at a distance identical to a radius r.

All the four rotating beam focus spots are configured to be moved along a circular processing line L having a radius r in conjunction with rotation of the first and second wedge prisms 134a, 134b moved by the second hollow motor 118. In other words, the four beam focus spots are configured to be moved along the circular processing line L while rotating about the center axis C arranged in the center of the four beam focus spots.

It should be noted that the radius r of the processing line L can be adjusted by moving the second tubular member 133b towards the first tubular member 133a for adjusting an interval between the first wedge prism 134a and the second wedge prism 134b.

Similarly to the first exemplary embodiment, the z-coordinate directional position of the second hollow motor 118 is adjusted for elevating the beam focus spots after the beam focus spots are circulated once along the processing line L, and the processing operation is repeatedly executed (see FIG. 6).

Features

The glass substrate processing device of the second exemplary embodiment has features identical to those of the glass substrate processing device of the first exemplary embodiment. Further, the glass substrate processing device of the second exemplary embodiment includes a structure configured to scan a processing line composed of the pair of the first and second wedge prisms 134a, 134b. Therefore, the structure configured to scan a processing line can be simply structured.

Modification of Second Exemplary Embodiment

In the second exemplary embodiment, the z-coordinate moving device 22 is used as a mechanism of moving a beam focus spot in the z-coordinate direction. Specifically, the z-coordinate moving device 22 is configured to move the second hollow motor 118 including the collective lens 135. However, the work table 2 may be configured to be moved in the z-coordinate direction without moving the second hollow motor 118 including the collective lens 135.

Other Exemplary Embodiments

The present invention is not limited to the aforementioned exemplary embodiments. Various changes or modifications can be made for the aforementioned exemplary embodiments without departing from the scope of the present invention.

Figure 13:
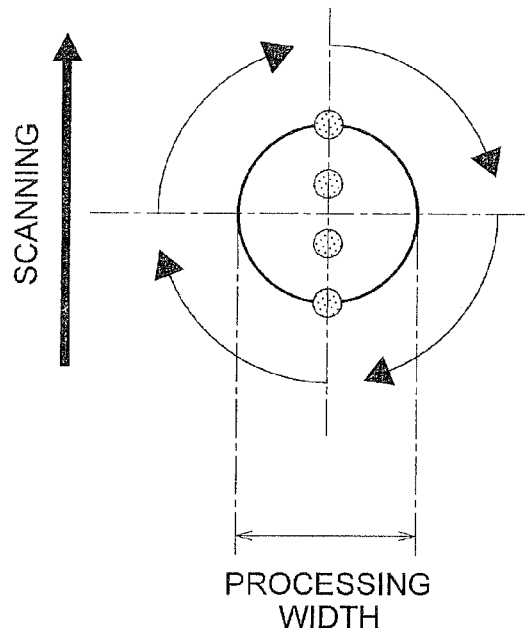
FIG. 13 is a diagram for illustrating arrangement of plural beam focus spots in another exemplary embodiment.

(a) In the aforementioned exemplary embodiments, components including the diffractive optical element are configured to form four beam focus spots on the circumference of an imaginary circle at an interval of an equal angle, as illustrated in FIGS. 5 and 12. However, the number of the beam focus spots and arrangement thereof are not limited to those set in the aforementioned exemplary embodiments. For example, four beam focus spots may be configured to be formed while being linearly aligned, as illustrated in FIG. 13. In this case, a laser beam is configured to be uniformly irradiated within a processing width.

Figure 14:
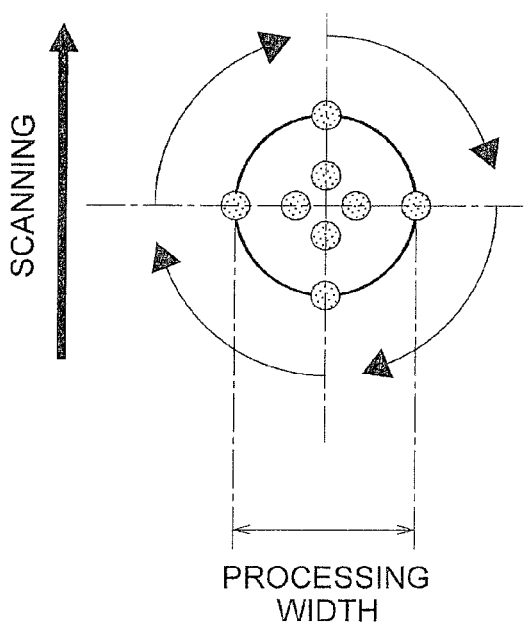
FIG. 14 is a diagram for illustrating arrangement of plural beam focus spots in yet another exemplary embodiment.

Further, plural beam focus spots may be configured to be formed while being arranged in a radial shape, as illustrated in FIG. 13. Specifically in the example of FIG. 14, four beam focus spots are formed on the circumference of an imaginary circle at an interval of an equal angle. Further, four beam focus spots, including the beam focus spots formed on the circumference of the imaginary circle, are linearly aligned at an identical interval in both of the x-coordinate direction and the y-coordinate direction.

(b) The specific structure of the optical system is not limited to the aforementioned exemplary embodiments. The optical system may have any suitable structure as long as the optical system is configured to easily adjust the optical axis of the laser beam to be irradiated from the laser beam output section 15 and effectively input the laser beam to be irradiated from the laser beam output section 15 into the diffractive optical element of the first hollow motor.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers, and/or steps. The foregoing also applies to words having similar meanings such as the terms, "including," "having," and their derivatives. Also, the terms "part," "section," "portion," "member," or "element" when used in the singular can have the dual meaning of a single part or a plurality of parts. As used herein to describe the present invention, the following directional terms "forward, rearward, above, downward, vertical, horizontal, below, and transverse" as well as any other similar directional terms refer to those directions of a glass substrate processing device that uses a laser beam. Accordingly, these terms, as utilized should be interpreted relative to a glass substrate processing device that uses a laser beam as normally used. Finally, terms of degree such as "substantially," "about," and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A processing device configured to irradiate a laser beam onto a glass substrate for processing the glass substrate, comprising:

a work table disposing a glass substrate as a processing target thereon;

a laser beam output section configured to output a laser beam;

a multi-spot focus section configured to receive the laser beam, the multi-spot focus section configured to split and to focus the laser beam inputted therein into a plurality of beam focus spots;

a rotation drive mechanism configured to rotate the plurality of beam focus spots about a single center axis arranged in a center of the plurality of beam focus spots;

an optical system configured to guide the laser beam outputted from the laser beam output section to the multi-spot focus section;

a laser beam scan section configured to move all the plurality of beam focus spots rotating about the single center axis in a desired direction within a predetermined range of a plane arranged along a surface of the glass substrate;

a diffractive optical element configured to split the laser beam inputted therein through the optical system into a plurality of laser beam fluxes; and a collective lens configured to concentrate the plurality of laser beam fluxes split by the diffractive optical element, the rotation drive mechanism configured to rotate the diffractive optical element.

2. The processing device according to claim 1, further comprising a z-coordinate moving device configured to move the plurality of beam focus spots in a direction perpendicular to the surface of the glass substrate.

3. The processing device according to claim 2, wherein the z-coordinate moving device is configured to move the multi-spot focus section and the laser beam scan section in the direction perpendicular to the surface of the glass substrate.

4. The processing device according to claim 1, further comprising
a work table moving device configured to move the work table within the predetermined range of the plane arranged along the surface of the glass substrate.

5. The processing device according to claim 1, wherein the rotation drive mechanism is a first hollow motor including a hollow part in the interior thereof, the hollow part supporting the diffractive optical element.

6. The processing device according to claim 1, wherein the multi-spot focus section is configured to split and to focus the laser beam inputted therein into a plurality of beam focus spots positioned on a circumference of an imaginary circle at an interval of an equal angle.

7. The processing device according to claim 1, wherein the multi-spot focus section is configured to split and to focus the laser beam inputted therein into a plurality of beam focus spots linearly aligned.

8. The processing device according to claim 1, wherein the work table includes a plurality of support portions, the plurality of support portions configured to be abutted to a bottom surface of the glass substrate to support the glass substrate, the plurality of support portions allowed to be disposed in predetermined positions without being overlapped with a processing line set on the glass substrate.

9. The processing device according to claim 1, wherein the laser beam scan section includes
an x-directional galvano mirror configured to move the laser beam in an x-coordinate direction within the predetermined range of the plane arranged along the surface of the glass substrate, and
a y-directional galvano mirror configured to move the laser beam in a y-coordinate direction perpendicular to the x-coordinate direction within the predetermined range of the plane arranged along the surface of the glass substrate.

10. The processing device according to claim 1, wherein the collective lens is an fθ lens.

11. The processing device according to claim 1, further comprising
a displacement mechanism configured to displace a rotation axis to allow the plurality of beam focus spots to rotated thereabout away from the center axis arranged in the center of the plurality of beam focus spots of the laser beam outputted from the multi-spot focus section,
wherein the laser beam scan section is configured to circulate the plurality of beam focus spots about the center axis within the predetermined range of the plane arranged along the surface of the glass substrate disposed on the work table under a condition that the plurality of beam focus spots are displaced away from the center axis in conjunction with displacement of the rotation axis.

12. The processing device according to claim 11, wherein the displacement mechanism includes two wedge prisms opposed to each other.

13. The processing device according to claim 12, wherein the displacement mechanism is configured to adjust an interval between the wedge prisms to adjust a circulation radius of the plurality of beam focus spots circulating about the center axis.

14. The processing device according to claim 12, wherein the laser scan section is a second hollow motor including a hollow part in the interior thereof, and the hollow part supports two wedge prisms.

* * * * *